(12) United States Patent
Gallo

(10) Patent No.: US 9,299,389 B2
(45) Date of Patent: Mar. 29, 2016

(54) INTERPRETATION OF FREE-FORM TIMELINES INTO COMPOSITING INSTRUCTIONS

(71) Applicant: Michael Gallo, Desenzano del Garda (IT)

(72) Inventor: Michael Gallo, Desenzano del Garda (IT)

(73) Assignee: Adobe Systems Incorporated, San Jose, CA (US)

( * ) Notice: Subject to any disclaimer, the term of this patent is extended or adjusted under 35 U.S.C. 154(b) by 783 days.

(21) Appl. No.: 13/625,540

(22) Filed: Sep. 24, 2012

(65) Prior Publication Data

US 2014/0086560 A1    Mar. 27, 2014

(51) Int. Cl.
*G11B 27/00*    (2006.01)
*G11B 27/034*    (2006.01)
*G11B 27/34*    (2006.01)

(52) U.S. Cl.
CPC .............. *G11B 27/034* (2013.01); *G11B 27/34* (2013.01)

(58) Field of Classification Search
CPC .. G11B 27/034; G11B 2220/90; G11B 27/34; G11B 27/105; H04N 9/8042
USPC ........................................................ 386/278
See application file for complete search history.

(56) References Cited

U.S. PATENT DOCUMENTS

| | | | | |
|---|---|---|---|---|
| 5,566,251 | A * | 10/1996 | Hanna et al. | 382/284 |
| 7,809,666 | B2 | 10/2010 | Citeau | |
| 8,553,037 | B2 * | 10/2013 | Smith et al. | 345/473 |
| 2010/0281382 | A1 * | 11/2010 | Meaney et al. | 715/723 |

OTHER PUBLICATIONS

"Traversal of Prefix Order Operators by Iteration," Research Disclosure 316, Aug. 11990. pp. 1-2.

* cited by examiner

*Primary Examiner* — Daniel Tekle
(74) *Attorney, Agent, or Firm* — Wolfe-SBMC

(57) ABSTRACT

A method, system, and computer-readable storage medium are disclosed for interpretation of free-form timelines into compositing instructions. An array comprising a plurality of items is generated. Each of the plurality of items comprises one or more instructions representing one or more operations occurring at a point in time in a video sequence. For each one of a plurality of patterns, the array is scanned to determine if one or more groups of items in the array match the pattern. For each group of items matching one of the plurality of patterns, the matching group of items is replaced in the array with a merged item. Each merged item comprises an ordered sequence of the one or more instructions in the corresponding matching group of items. A frame of the video sequence is composited dependent on the array comprising the one or more merged items.

20 Claims, 10 Drawing Sheets

INTERPRETATION OF FREE-FORM TIMELINES INTO COMPOSITING INSTRUCTIONS

BACKGROUND

Description of the Related Art

Digital image processing is the process of analyzing and/or modifying digital images using a computing device, e.g., a computer system. Digital images may include both standalone images and frames of video sequences. Using specialized software programs, digital images may be manipulated and transformed in a variety of ways. Digital image processing programs may include programs of differing complexity such as limited-purpose programs associated with acquisition devices (e.g., digital cameras and scanners with bundled or built-in programs for managing brightness and contrast), limited editors suitable for relatively simple operations, and professional-grade programs with large and complex feature sets.

Digital images may include raster graphics, vector graphics, or a combination thereof. Raster graphics data (also referred to herein as bitmap data) may be stored and manipulated as a grid of individual picture elements called pixels. Suitable image editors may be used to modify pixels (e.g., values such as hue, brightness, saturation, transparency, etc.) on a pixel-by-pixel basis or as a group. A bitmap may be characterized by its width and height in pixels and also by the number of bits per pixel. Commonly, a color bitmap defined in the RGB (red, green, blue) color space may comprise between one and eight bits per pixel for each of the red, green, and blue channels. An alpha channel may be used to store additional data such as per-pixel transparency values. Vector graphics data may be stored and manipulated as one or more geometric objects. The geometric primitives (e.g., points, lines, polygons, Bézier curves, and text characters) may be based upon mathematical equations to represent parts of digital images. Suitable image editors may be used to perform operations on these objects such as rotation, translation, stretching, skewing, changing depth order, and combining with other objects. Vector graphics are often rasterized, or converted to raster graphics data, in the process of displaying the data on a display device or printing the data with a printer. While raster graphics may often lose apparent quality when scaled to a higher resolution, vector graphics may scale to the resolution of the device on which they are ultimately rendered.

A digital video sequence may be created and/or edited a using suitable authoring program. Using a suitable video editor, various elements of a video sequence such as video clips and transitions may be arranged in one or more tracks on a timeline. Some video editors may also permit the use of additional types of timeline elements, such as color grading clips that apply color grading operations to modify the color values of video clips. In a free-form timeline, the various elements may be freely arranged by a user in different configurations such that multiple elements overlap at various points on the timeline. At any point on the timeline, proper interpretation of the overlapping elements is essential to producing a proper output frame.

SUMMARY

Various embodiments of systems, methods, and computer-readable storage media for interpretation of free-form timelines into compositing instructions. In one embodiment, an array comprising a plurality of items is generated. Each of the items may comprise one or more instructions representing one or more operations occurring at a point in time in a video sequence. For each one of a plurality of patterns, the array may be scanned to determine if one or more groups of items in the array match the pattern. For each group of items matching one of the patterns, the matching group of items may be replaced with a merged item. Each merged item may comprise an ordered sequence of the one or more instructions in the corresponding matching group of items. A frame of the video sequence may then be composited based on the instructions as ordered in the array comprising the one or more merged items.

DETAILED DESCRIPTION OF EMBODIMENTS

Figure 1:
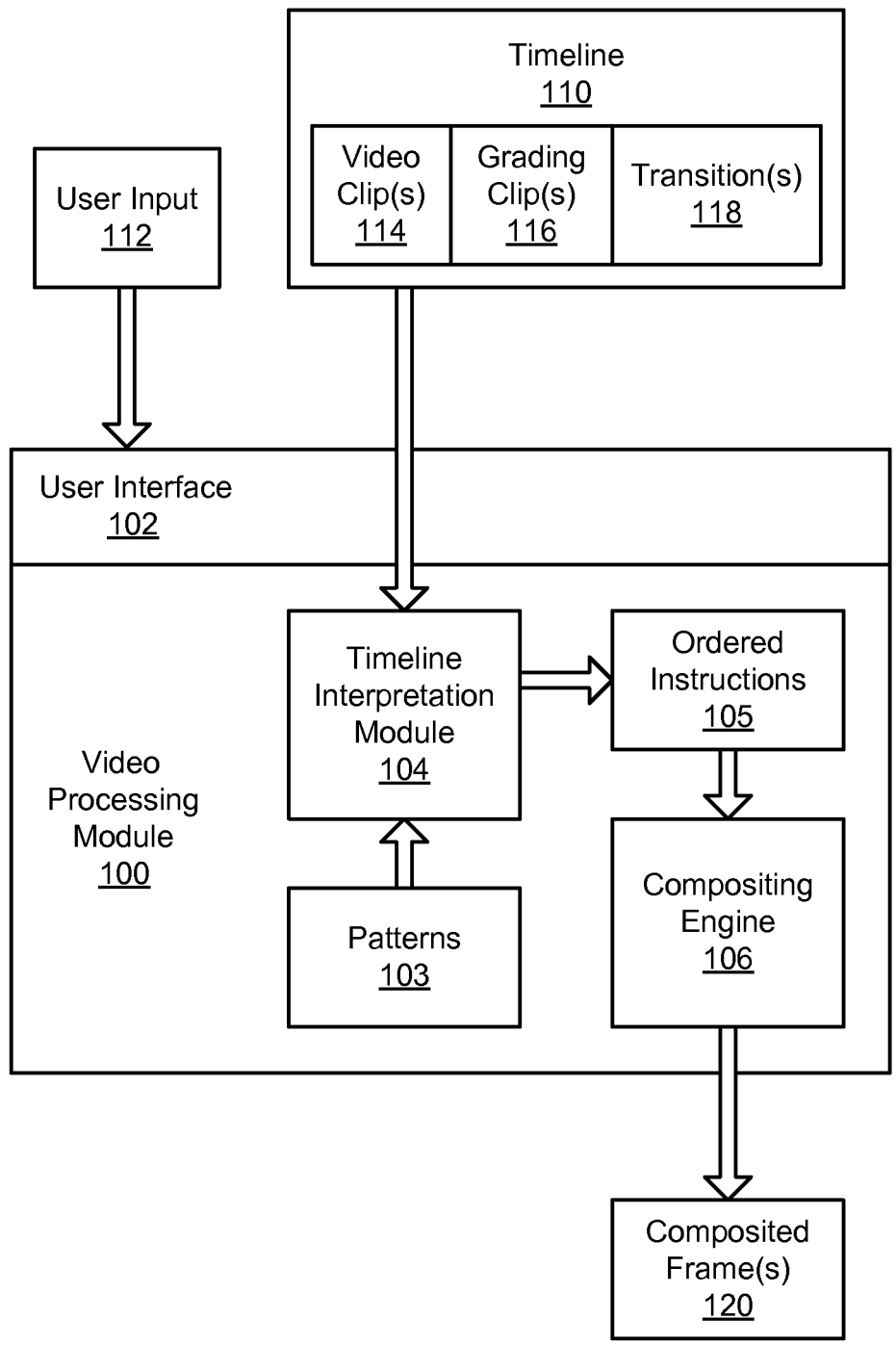
FIG. 1 illustrates an example of a video processing module configured for interpretation of free-form timelines into compositing instructions, according to one embodiment.

Using embodiments of the systems and methods described herein, a free-form timeline for a video sequence may be automatically interpreted to generate compositing instructions. The timeline may include various elements such as video clips, grading clips, and transitions that are arranged by a user in a particular configuration. Instructions corresponding to the elements of the timeline may be matched to various patterns to place the compositing instructions in a particular order. Based on the compositing instructions, a virtual machine or other compositing engine may generate one or more frames of the video sequence in a manner that reflects the intent of the user in arranging the elements of the timeline.

In one embodiment, instructions for compositing a frame of a video sequence are placed into a data structure. The data structure may be an array. A pattern-matching technique may then be applied to the instructions in the data structure for a set of patterns. The data structure may be scanned for each of the set of patterns in order, from the highest priority pattern to the lowest priority pattern. If a set of instructions matches one of the patterns, the matching instructions may be merged into a single item and replaced in the data structure with the merged item. In this manner, the compositing instructions may be properly ordered. Using the ordered instructions in the modified data structure, the frame may be composited.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 illustrates an example video processing module 100 that may implement embodiments of methods and systems for interpretation of free-form timelines into compositing instructions. Video processing module 100 may obtain a timeline 110 as input. The timeline 110 may comprise various combinations of elements of a video sequence that are arranged by a user in a particular configuration. As shown by way of example, the timeline 110 may comprise one or more video clips 114, one or more grading clips 116, and one or more transitions 118. One of the grading clips 116 may apply a color grading operation to modify one or more colors in at least one of the video clips 114. In various embodiments, the timeline 110 may also comprise one or more mask clips (e.g., usable to select part of the image), transformation tracks (e.g., usable to rotate or scale the image), audio tracks, and/or track groupings (e.g., usable to group a set of tracks into one logical unit). The timeline 110 may present the various elements in a chronological sequence, and a playhead may indicate a current horizontal position (e.g., a particular time code or frame number) along the timeline 110. As the playhead progresses along the timeline 110, the playhead may intersect different combinations of elements at different points along the timeline 110.

In one embodiment, the timeline 110 is a free-form timeline, and the elements may be freely positioned using multiple tracks such that combinations of the elements overlap at various points on the timeline. Using the free-form timeline 110, the user may arrange the various elements of the timeline 110 in different combinations. For example, the user may apply a single grading clip to a sequence of multiple video clips or arrange transitions between different combinations of grading clips and video clips. Proper interpretation of these combinations of overlapping elements is essential to producing output that reflects the intent of the user in arranging the various elements. For example, a transition clip may apply a transition between two video clips, between a video clip and a grading clip, or between two different grading clips. The use of the transition may produce different results depending on its context. Therefore, proper interpretation of a timeline 110 that includes a transition 118 is essential in generating a properly composited output frame.

In one embodiment, video processing module 100 may also provide a user interface 102 that includes one or more user interface elements via which a user may initiate, interact with, direct, and/or control the methods performed by module 100. In one embodiment, the user interface 102 may comprise a graphical user interface (GUI) including one or more user interface controls and one or more elements for presenting video content. In one embodiment, video processing module 100 may obtain user input 112, such as one or more instructions to arrange the elements of the timeline 110 and/or perform the method for interpretation of free-form timelines into compositing instructions. In various embodiments, the techniques for interpretation of free-form timelines into compositing instructions may be performed automatically by the video processing module 100 and/or upon receiving an appropriate instruction from a user (e.g., user input 112).

At each point along the timeline 110, the interpretation of the configuration of elements (e.g., the order of operations reflecting overlapping tracks) should correctly reflect the user's intent. Accordingly, a timeline interpretation module 104 may analyze the configuration of elements and generate a corresponding set of instructions 105 for compositing one or more frames of the video sequence. As will be described in greater detail below, the timeline interpretation module 104 may produce compositing instructions 105 by matching instructions corresponding to the elements of the timeline to various patterns 103. In one embodiment, the set of patterns 103 may be defined and placed in a particular order based on their relative priority. The patterns 103 and their priority may be stored and then reused across multiple instances of the video processing module 100. Using this pattern-matching technique, the timeline interpretation module 104 may place the compositing instructions 105 in a particular order prior to the compositing of any corresponding frame(s) of the video sequence. In one embodiment, the timeline interpretation module 104 may add operators and/or empty operands where appropriate. In one embodiment, the timeline interpretation module 104 may resolve operator precedence and auto-associativity. The compositing instructions 105 may be ordered in such a way as to produce composited output that reflects the intent of the user in arranging the various elements on the timeline. In one embodiment, the process(es) performed by the timeline interpretation module 104 may be performed automatically and/or programmatically.

In one embodiment, a compositing engine 106 may take the compositing instructions 105 as input and may produce one or more composited frames 120 as output. The compositing engine 106 may comprise any module that is configured to composite one or more video frames based on a set of compositing instructions. In one embodiment, the compositing engine 106 may comprise a virtual machine. The virtual machine may execute, interpret, or otherwise cause to be performed a set of instructions for compositing the frame(s) 120 using various elements (e.g., video clips, grading clips, transitions, etc.) of the timeline 110. In one embodiment, the process(es) performed by the compositing engine 106 may be performed automatically and/or programmatically.

Video processing module 100 may be implemented as or in a stand-alone application or as a module of or plug-in for a video or image processing and/or presentation application. Examples of types of applications in which embodiments of video processing module 100 may be implemented may include, but are not limited to, video or image editing, processing, and/or presentation applications, as well as applications in security or defense, educational, scientific, medical, publishing, digital photography, digital films, games, animation, marketing, and/or other applications in which digital video image editing or presentation may be performed. Specific examples of applications in which embodiments may be implemented include, but are not limited to, Adobe® SpeedGrade® and Adobe® Premiere® (all available from Adobe Systems, Inc.). In addition to generating the composited frame(s) 120, video processing module 100 may be used to display, manipulate, modify, and/or store the composited frame(s) 120, e.g., to a memory medium or storage medium.

Figure 2:
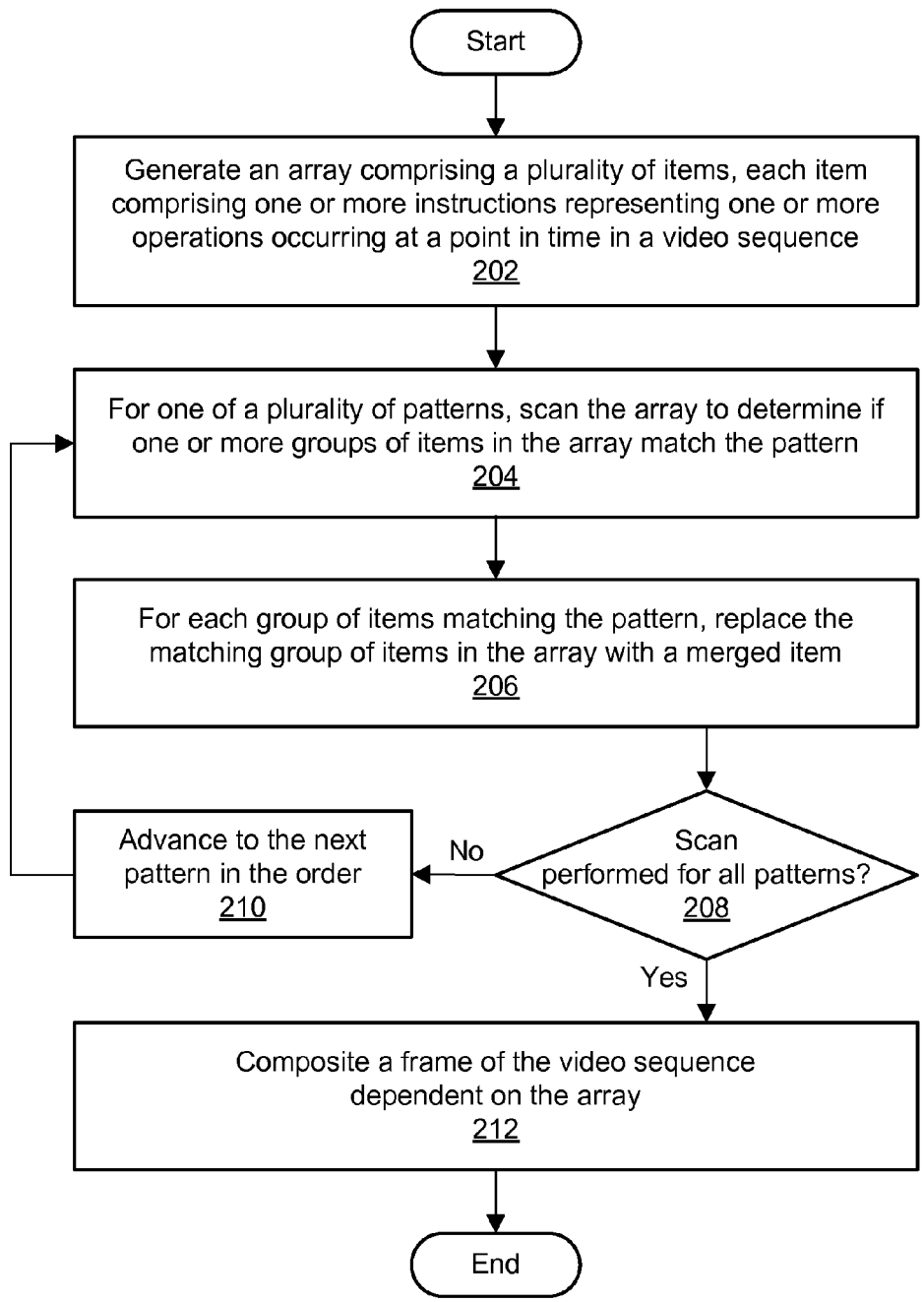
FIG. 2 is a flowchart illustrating a method for interpretation of free-form timelines into compositing instructions, according to one embodiment.

FIG. 2 is a flowchart illustrating a method for interpretation of free-form timelines into compositing instructions, according to one embodiment. The method shown in FIG. 2 may be used in conjunction with embodiments of the computer system shown in FIG. 10, among other devices. In various embodiments, some of the method elements shown may be performed concurrently, may be performed in a different order than shown, or may be omitted. Additional method elements may also be performed as desired. Any of the method elements described may be performed automatically (i.e., without direct user intervention) and/or programmatically (i.e., by execution of program instructions). As shown, this method may operate as follows.

At any point on the timeline, as indicated by the playhead, each element of the timeline (e.g., each video clip, grading clip, transition, etc.) may be turned into a set of one or more tokens or items representing code fragments. In other words, each track may be converted to a corresponding set of one or more instructions for the compositing engine 106. In one embodiment, the instructions may be stored in an array (or any other suitable data structure) in which each element (e.g., clip) of the timeline initially corresponds to a single item in the array. The array may be initially ordered based on the configuration of the overlapping elements in the timeline 110, such as an ordering of the elements from bottom to top. Accordingly, as shown in 202, an array comprising a plurality of items may be generated. Each of the plurality of items may comprise one or more instructions representing one or more operations occurring at a point in time in a video sequence. In one embodiment, each of the plurality of items is stored in the array with a suitable type identifier. For example, each video clip may be associated with a first type identifier (e.g., Operand), each grading clip may be associated with a second type identifier (e.g., Grading), each transition may be associated with a third type identifier (e.g., Dissolve), etc.

The instructions in the initial array may be re-ordered using pattern matching to produce the correct result when the image is composited. As shown in 204, for each one of a plurality of patterns, the array may be scanned to determine if one or more groups of items in the array match the pattern. The array may be scanned for each one of the plurality of patterns in a predefined order. For example, the array may first be scanned for a first pattern according to the pattern priority. In one embodiment, each pattern may be a template including one or more of the type identifiers, and the scanning operation may use the type identifiers stored in the array to find corresponding matching items in the array. In one embodiment, any given pattern may match zero, one, or more than one combination of items in the array.

If a pattern is matched to items in the array, then the array may be modified by replacing the relevant items with a merged item so that the output array has fewer items than the input array. Accordingly, as shown in 206, for each group of items matching one of the plurality of patterns, the matching group of items may be replaced in the array with a merged item. Each merged item may comprise an ordered sequence of the one or more instructions in the corresponding matching group of items. For example, if a match for the first pattern is found, then the relevant items may be merged into a single item that includes the instructions (e.g., code fragments or tokens) from each of the corresponding items that matched the pattern. For subsequent iterations after the first pattern is matched, a matching group of items may comprise one or more merged items. In one embodiment, replacing the matching group of items in the array with the merged item may comprise reducing the array to a single merged item.

As shown in 208, the method may determine whether the scan has been performed for all of the patterns. If not, then as shown in 210, the method may advance to the next pattern in the pattern order. The method may then return to the operation shown in 204. For example, in the second iteration of the operation shown in 204, the array may be scanned for a second pattern in the pattern priority. If a match for the second pattern is found, then the relevant items may be merged into a single item in the second iteration of the operation shown in 206. In this manner, the array may be scanned sequentially for each of the patterns according to their predefined priority. In one embodiment, items matching the patterns may be replaced with merged items until the array includes only one merged item. The resulting single item may include a properly ordered set of code fragments representing a valid sequence of instructions that are interpretable or executable by the compositing engine to generate the frame in accordance with the user's intent. However, if the array comprises more than one item after all the patterns have been matched, then any superfluous non-merged items may be deleted from the array. The deleted items that match none of the plurality of patterns may be considered to represent erroneous arrangements of elements in the timeline.

If the method has scanned the array for all of the patterns, then as shown in 212, a frame of the video sequence may be composited dependent on the array comprising the one or more merged items. The frame may be composited using a compositing engine to interpret the instructions in the array in the specified order. In the manner shown in FIG. 2, multiple frames of a video sequence may be properly composited based on a free-form timeline as the playhead advances through the timeline.

For each element (e.g., clip) intersected by the playhead at a particular point on the timeline, the timeline interpretation module 104 may generate one or more instructions (i.e., code fragments) that are interpretable or executable by the compositing engine 106. The short code fragments may be arranged and ordered into a longer program 105 that the compositing engine 160 may turn into the output frame(s) 120. For example, an instruction of the form [filename] may cause the compositing engine 106 to request the named file from the frame cache and push the file onto the main stack. The instruction *push may cause the compositing engine to duplicate the item on top of the main stack and store it in a push register. The instruction *pop may cause the compositing engine to place the contents of the push register on top of the main stack. The instruction *fade [%] may cause the compositing engine to blend the topmost two main stack items with the specified percentage. The instruction *xform [ID] may cause the compositing engine to apply a transformation with the given ID to the operand on the top of the main stack. The instruction *mask[ID] may cause the compositing engine to add the mask with given ID to the current list of masks. The instruction *grading[ID] may cause the compositing engine to apply the grading with the given ID to the top operand on the main stack. The instruction *lut may cause the compositing engine to transform the second to last operand on the main stack using the topmost item as a lookup table. The ID (identifier) numbers may correspond to the internal IDs of objects accessible to the compositing engine 105. These particular instructions are given for purposes of example, and it is contemplated that additional instructions may be interpreted or executed by the compositing engine 106 to generate the composited frame(s) 120.

Therefore, for a given point on the timeline, the timeline interpretation module 104 may generate a set of one or more instructions in a particular sequence. Within a sequence, the instructions may be arranged in the order in which they are expected to be interpreted or executed by the compositing engine 106. For example, the simplest sequence generated for a grading clip may comprise: *grading[ID]. If the grading clip is combined with a mask, the following sequence may be produced: *mask[ID]|*grading[ID]. For an animated grading operation, the following sequence may be produced: *push|*grading[ID]|*pop|*grading[ID2]|*fade [%]. For an animated grading operation combined with a mask, the following sequence may be produced: *push|*mask[ID]|*grading[ID]|*pop|*mask[ID]|*grading[ID2]|*fade [%]. In one embodiment, a "shot" clip contains video footage and therefore always generates a [filename] instruction (in a format the frame cache supplying the frames is expected to understand). If a "shot" clip also contains a mask and/or a grading, then any of the grading sequences above may be appended to the [filename] instruction as appropriate.

In one embodiment, the set of patterns 103 may include the following entries, in order from first priority (i.e., scanned and merged first) to last priority (i.e., scanned and merged last). A first pattern of the form "Group begin [any items] Group end" may trigger the behavior of processing a track group recursively with a resulting item type that depends on the items in the group. A second pattern of the form "Mask [any item]" may trigger the behavior of merging the mask with the following item and may produce a resulting item type that is the same as the following item. A third pattern of the form "[any items] Dissolve [any items]" may trigger the behavior of applying auto-associative dissolve heuristics and may produce a resulting item type that is the same as the bottommost item. As used herein, "dissolve" indicates any timeline operator (e.g., a transition) that combines two operands. A fourth pattern of the form "Operand Grading" may trigger the behavior of merging the grading with the operand and may produce a resulting item of the type Operand. A fifth pattern of the form "Operand Operand" may trigger the behavior of merging and appending the compositing instruction and may produce a resulting item of the type Operand. A sixth pattern of the form "[any item] [any item]" may trigger merging behavior and may produce a resulting item type that is the same as the first item. These particular patterns are given for purposes of example, and it is contemplated that additional patterns may be used by the timeline interpretation module 104 to generate the ordered compositing instructions 106.

FIGS. 3-9 illustrate examples of a timeline that is automatically interpreted to produce compositing instructions, according to one embodiment. The horizontal axis of the timeline represents time, and the vertical axis of the timeline represents an approximate order of operations (e.g., from bottom to top). FIGS. 3-9 illustrate different time slices or segments of the same timeline. The order of operations may be further influenced by the use of track grouping and by other aspects of the timeline composition, such as the ability of the user to hide tracks. For purposes of example, the timeline is shown to include seven tracks: a first track 310, a second track 320, a third track 330, a fourth track 340, a fifth track 350, a sixth track 360, and a seventh track 370. Each track may contain clips that represent content. In the example timeline, all of the clips within a particular track represent the same type of content. For example, the first track 310 and seventh track 370 are "shot" tracks that contain clips of video footage with optional associated grading operations and masks. As another example, the second track 320, fourth track 340, and fifth track 350 are "grading" tracks that contain color grading operations (i.e., looks) and/or masks. As yet another example, the third track 330 and sixth track 360 are "dissolve" tracks that contain transitions (e.g., dissolves) between tracks positioned above and below. In one embodiment, track groups may be used to indicate that the member tracks should be processed together as a single logical unit. In the example timeline, the fourth track 340 and fifth track 350 have been placed in a track group 380. In one embodiment, track groups may be nested inside other track groups. It is contemplated that different numbers and combinations of tracks may be used with the systems and methods described herein. Additionally, it is contemplated that different types of tracks may be used with the systems and methods described herein. For example, mask-only tracks, audio tracks, and transformation (e.g., pan & scan) tracks may also be used in the timeline.

Figure 3:
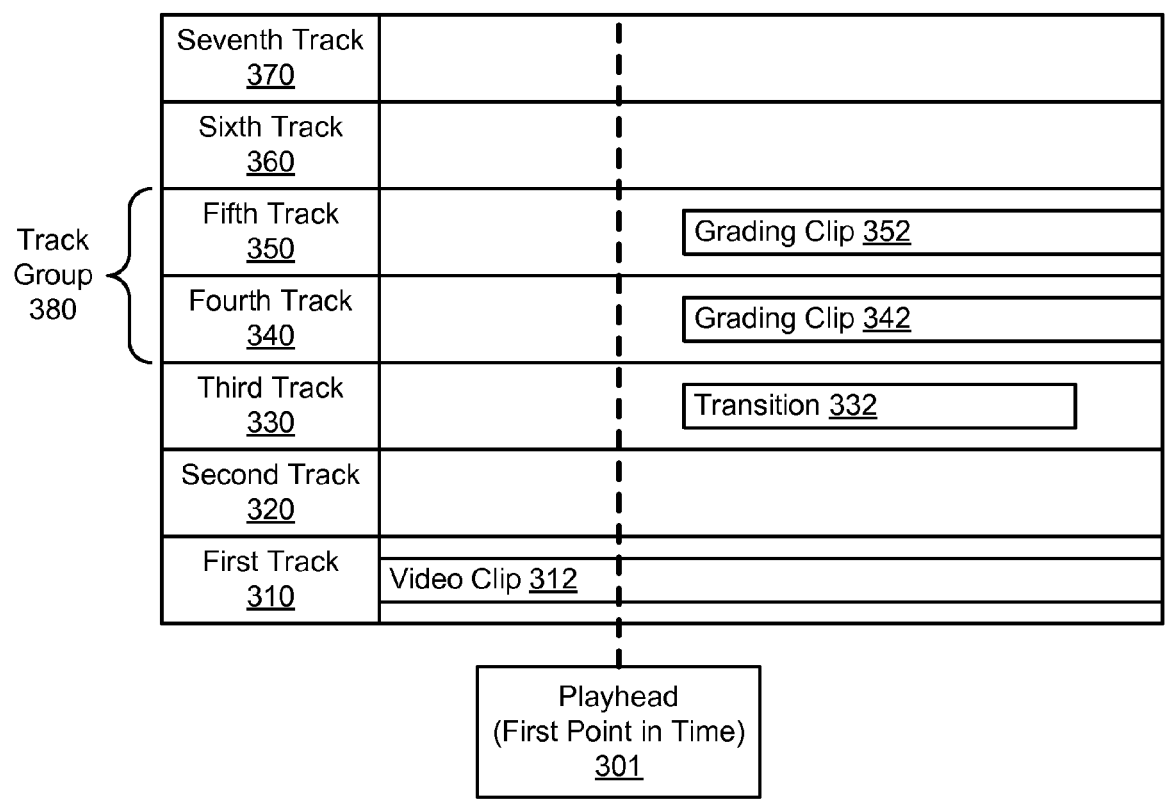
FIG. 3 illustrates a first example of a timeline that is automatically interpreted to produce compositing instructions, according to one embodiment.

FIG. 3 illustrates a first example of a timeline that is automatically interpreted to produce compositing instructions, according to one embodiment. A playhead may indicate a current horizontal position (e.g., a particular time or frame number) along the timeline. As the playhead progresses along the timeline, the playhead may intersect different combinations of elements (e.g., clips) at different points. For example, at a first point in time, the playhead 301 intersects only a video clip 312 in the first track 310. As shown in the example, the playhead 301 does not intersect transition 332, grading clip 342, or grading clip 352 in the other tracks. In this example, the timeline interpretation module 104 may produce a simple instruction sequence comprising the [filename] of the video clip 312. The [filename] instruction may be stored in the array as a single item with the type Operand. Because none of the patterns match a single Operand item, the method shown in FIG. 2 will not match any of the patterns. Thus, in the simple example shown in FIG. 3, the single compositing instruction is not re-ordered using the pattern-matching functionality of the timeline interpretation module 104. The resulting program for the compositing engine 106 will include the [filename] of the video clip 312. When performing this instruction, the compositing engine 106 may request the frame contained in that file from the frame cache. Because the instruction is the last operand left on the main stack after the execution of the program, the compositing engine 106 may then display it on the screen and/or save it to an output file.

Figure 4:
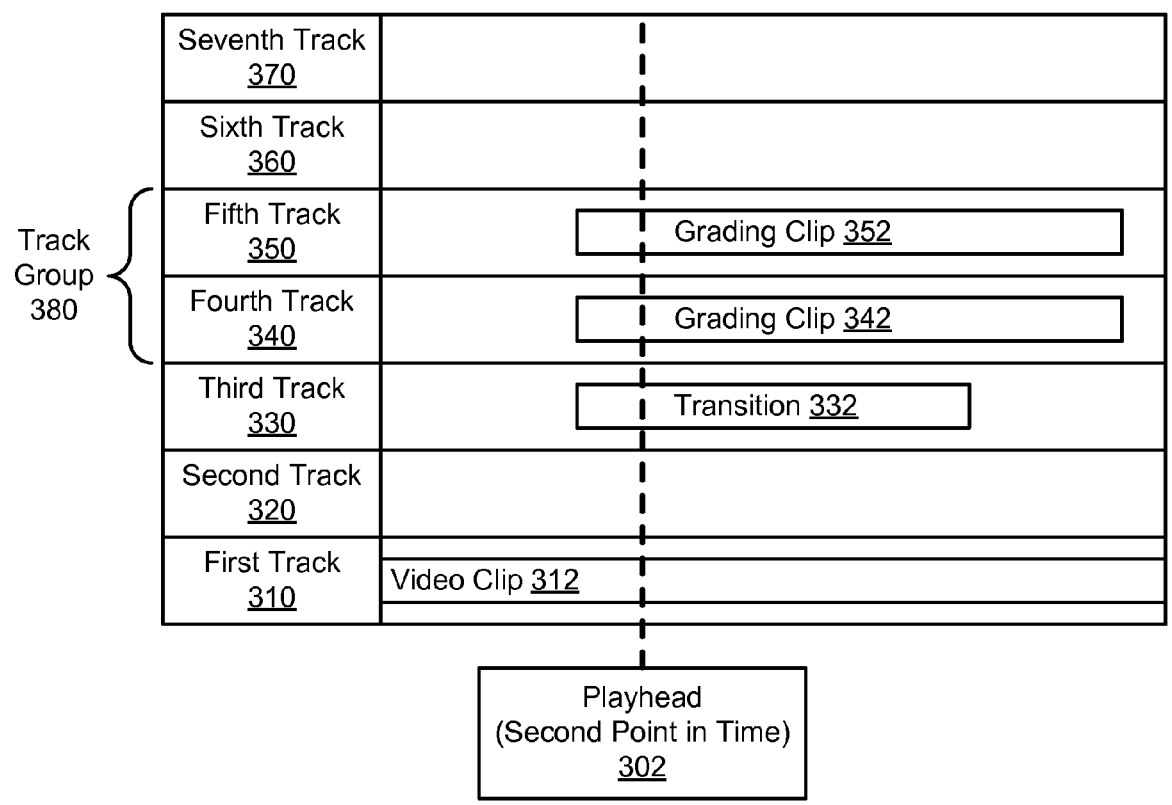
FIG. 4 illustrates a second example of a timeline that is automatically interpreted to produce compositing instructions, according to one embodiment.

FIG. 4 illustrates a second example of a timeline that is automatically interpreted to produce compositing instructions, according to one embodiment. The combination of elements intersected by the playhead 302 at the second point in time is one of the valid combinations of inputs for the dissolve operator. Each of the valid combinations produces a fixed, pre-programmed sequence of instructions, with the input sequences inserted at appropriate places. The grading clips 342 and 352 are in tracks that are members of the track group 380. Accordingly, the two grouped gradings 342 and 352 may be converted into a two-instruction sequence of type Grading by application of the "Group begin [any items] Group end" pattern (which triggers recursion) and the "[any item] [any item]" pattern. This particular point on the timeline will therefore include one Operand below and one Grading above. This configuration may produce the fixed sequence "Operand|*push|*pop|Grading|*fade [%]," where the % value varies according to the exact coordinate where the playhead 302 intersects the dissolve clip 332, and where Operand and Grading are replaced by the inputs respectively. The resulting item type may be Operand.

Figure 5:
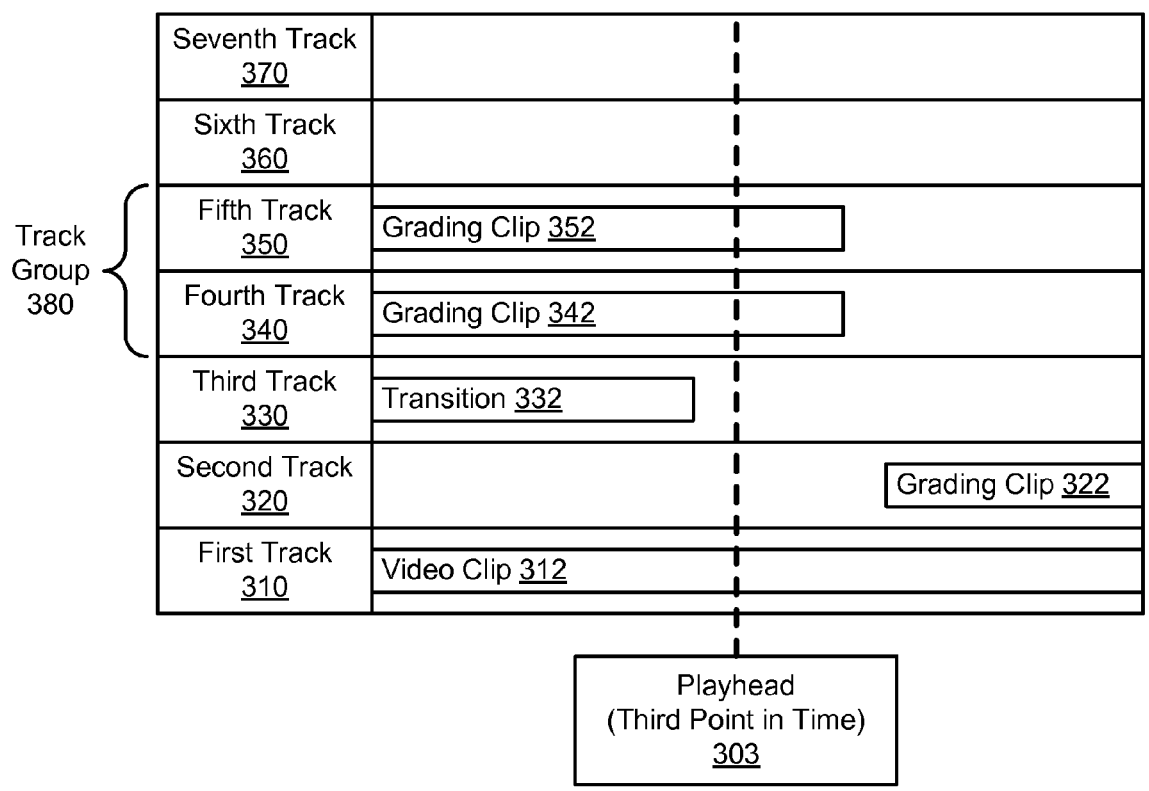
FIG. 5 illustrates a third example of a timeline that is automatically interpreted to produce compositing instructions, according to one embodiment.

FIG. 5 illustrates a third example of a timeline that is automatically interpreted to produce compositing instructions, according to one embodiment. At a third point in time, the playhead 303 may intersect the two grouped grading clips 352 and 342 and the video clip 312. The input array may be generated as follows: [filename] (of video clip 312, type Operand), (empty) (of type Group Start), *grading[342] (of type Grading), *grading[352] (of type Grading), and (empty) (of type Group End). The input array has five items, including three items that each contain one instruction and two items that contain no instructions (group start and end). The first pattern that matches is the "Group begin [any items] Group end" pattern, which causes recursion and separate processing of the two gradings. The "[any item] [any item]" pattern matches the two gradings, so they may be simply combined together into one merged item "*grading[342]|*grading[352]" (of type Grading). After the recursion ends, the array has only two items: an Operand and the merged Grading item. These items may be matched to the pattern "Operand Grading" to produce a final merged item "[filename]|*grading[342]|*grading[352]" (of type Operand). The compositing engine 106 may load the relevant frame from the video clip 312, apply *grading[342], and then apply *grading[352]. Because the resulting image remains on the top of the main stack, it may be shown on the display or written to a file.

Figure 6:
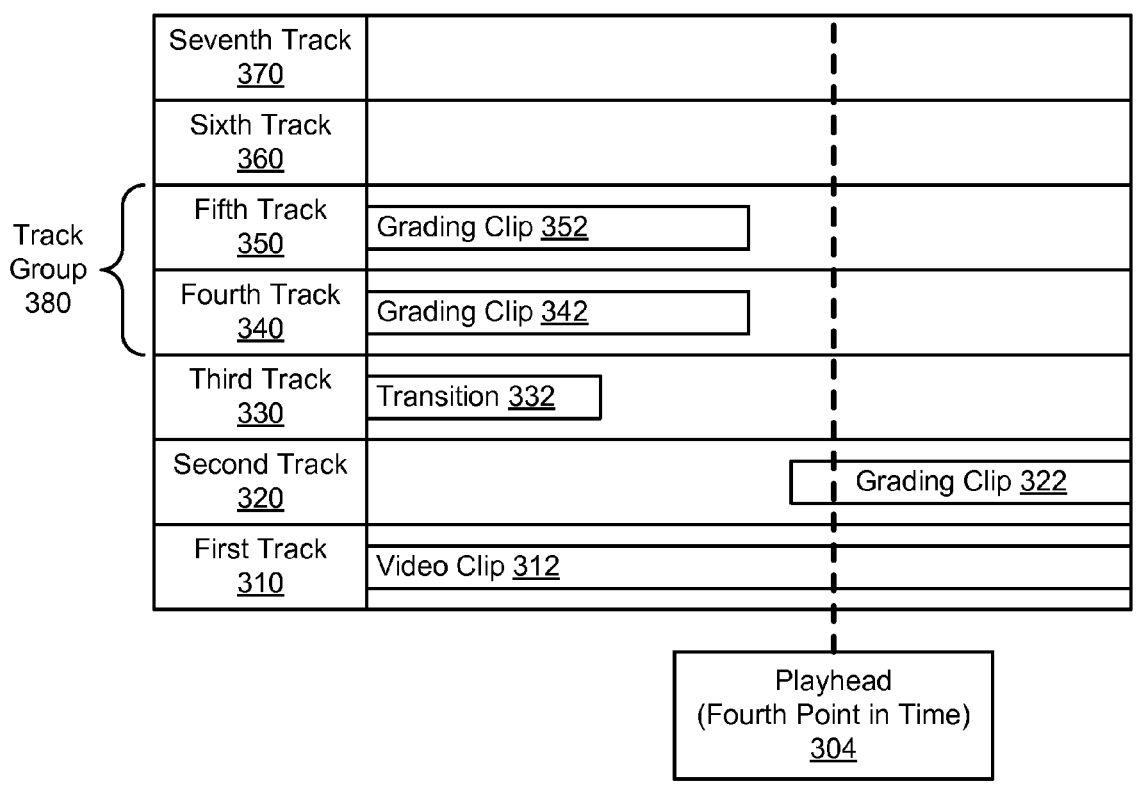
FIG. 6 illustrates a fourth example of a timeline that is automatically interpreted to produce compositing instructions, according to one embodiment.

FIG. 6 illustrates a fourth example of a timeline that is automatically interpreted to produce compositing instructions, according to one embodiment. At a fourth point in time, the playhead 304 intersects the video clip 312 in the first track 310 and a grading clip 322 in the second track. In populating the array of instructions based on these items, the video clip 312 may be represented by the [filename] of the video clip 312 (of type Operand), and the grading clip 322 may be represented by *grading[ID] (of type Grading because the sequence originated in a grading clip). The array may thus include an Operand item and a Grading item. In scanning this array for the various patterns, a match for the fourth pattern may be found. The two items may be merged (e.g., by adding a vertical bar between them), and the resulting merged item may be placed back in the array with the type Operand. In the example of FIG. 6, no other patterns may be successfully matched, and so the program "[filename]|*grading[ID]" may be sent to the compositing engine 106. The compositing engine 106 may request the appropriate frame of the video clip 312 (at the fourth point in time), push it onto the main stack, and then apply the grading operation from the grading clip 322. Because the graded frame is the last remaining operand on the stack, it will be shown on the display and/or written to the output file.

Figure 7:
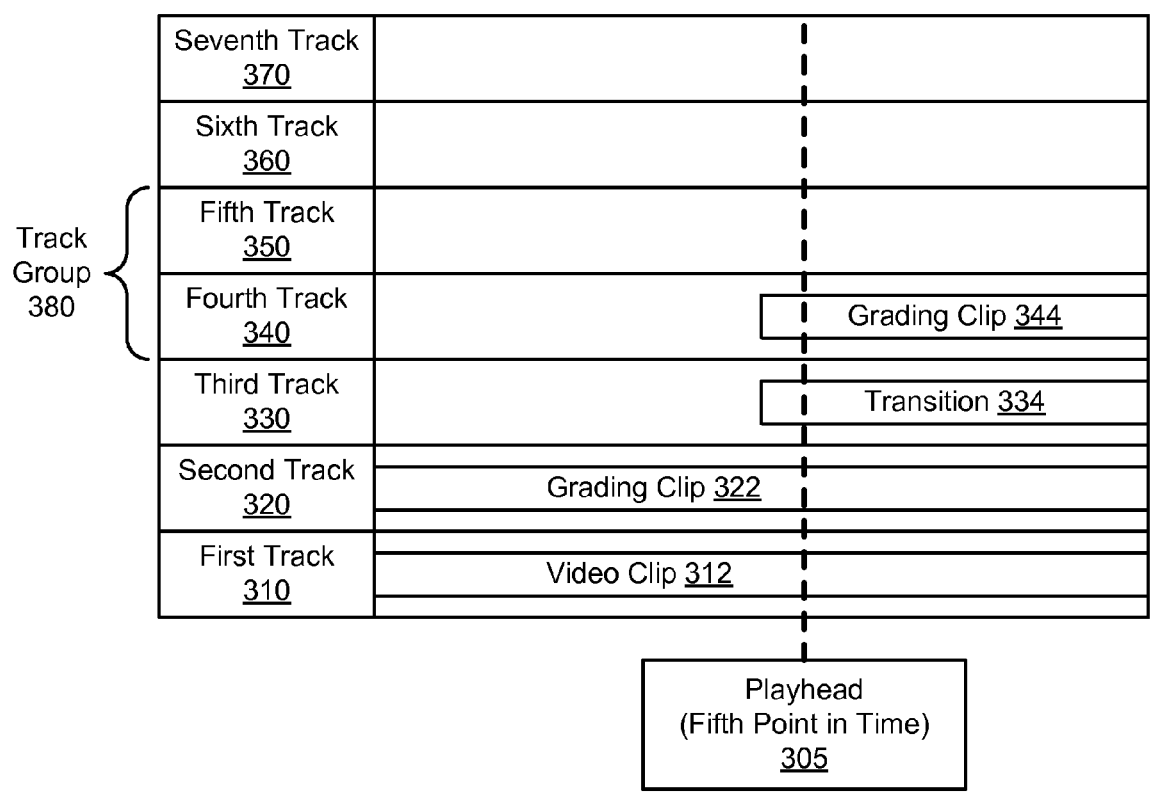
FIG. 7 illustrates a fifth example of a timeline that is automatically interpreted to produce compositing instructions, according to one embodiment.

FIG. 7 illustrates a fifth example of a timeline that is automatically interpreted to produce compositing instructions, according to one embodiment. The combination of elements intersected by the playhead 305 at the fifth point in time is one of the valid combinations of inputs for the dissolve operator. Each of the valid combinations produces a fixed, pre-programmed sequence of instructions, with the input sequences inserted at appropriate places. In this example, the transition (e.g., dissolve) 334 is surrounded by a top grading clip 344 and a bottom grading clip 334 after the group pattern is matched. The resulting sequence of instructions may be produced (of type Grading): "*push|bottom Grading|*pop|top Grading|*fade [%]." This sequence may be merged with the [filename] of video clip 312 using the "Operand Grading" pattern.

Figure 8:
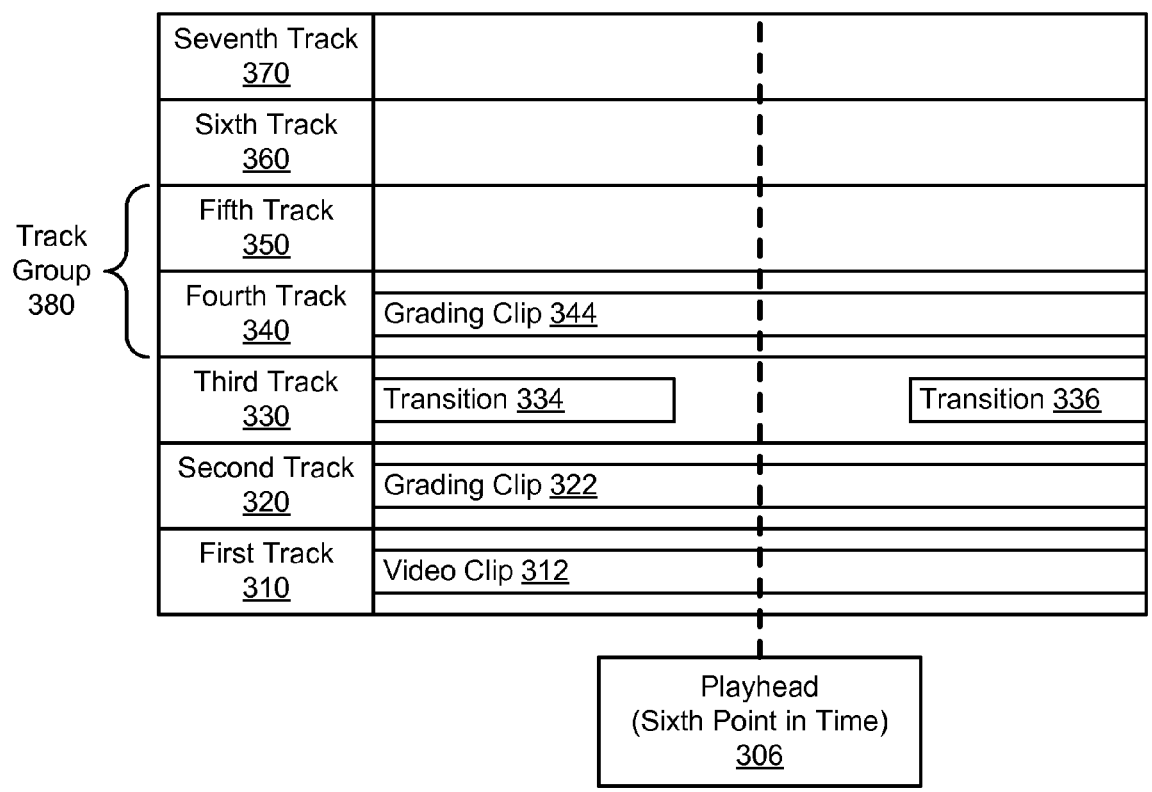
FIG. 8 illustrates a sixth example of a timeline that is automatically interpreted to produce compositing instructions, according to one embodiment.

FIG. 8 illustrates a sixth example of a timeline that is automatically interpreted to produce compositing instructions, according to one embodiment. At a sixth point in time, the playhead 306 intersects a video clip 312, a grading clip 322, and a grading clip 344 that is part of the track group 380. In the third track 330, neither the transition 334 nor the transition 336 is intersected. The array is initially populated with the items: [filename] (of video clip 312, type Operand), *grading[322] (of type Grading), (empty) (of type Group Start), *grading[344] (of type Grading), and (empty) (of type Group End). The group pattern matches, but only the element *grading[344] results from the recursion since it is the only item in the group. After that, the "Operand Grading" pattern is matched twice. First, the "Operand Grading" pattern is applied to produce the merged item "[filename]|*grading[322]" (of type Operand). The same pattern is then matched again with the remaining two items in the array to produce the final item "[filename]|*grading[322]|*grading[344]" (of type Operand).

Figure 9:
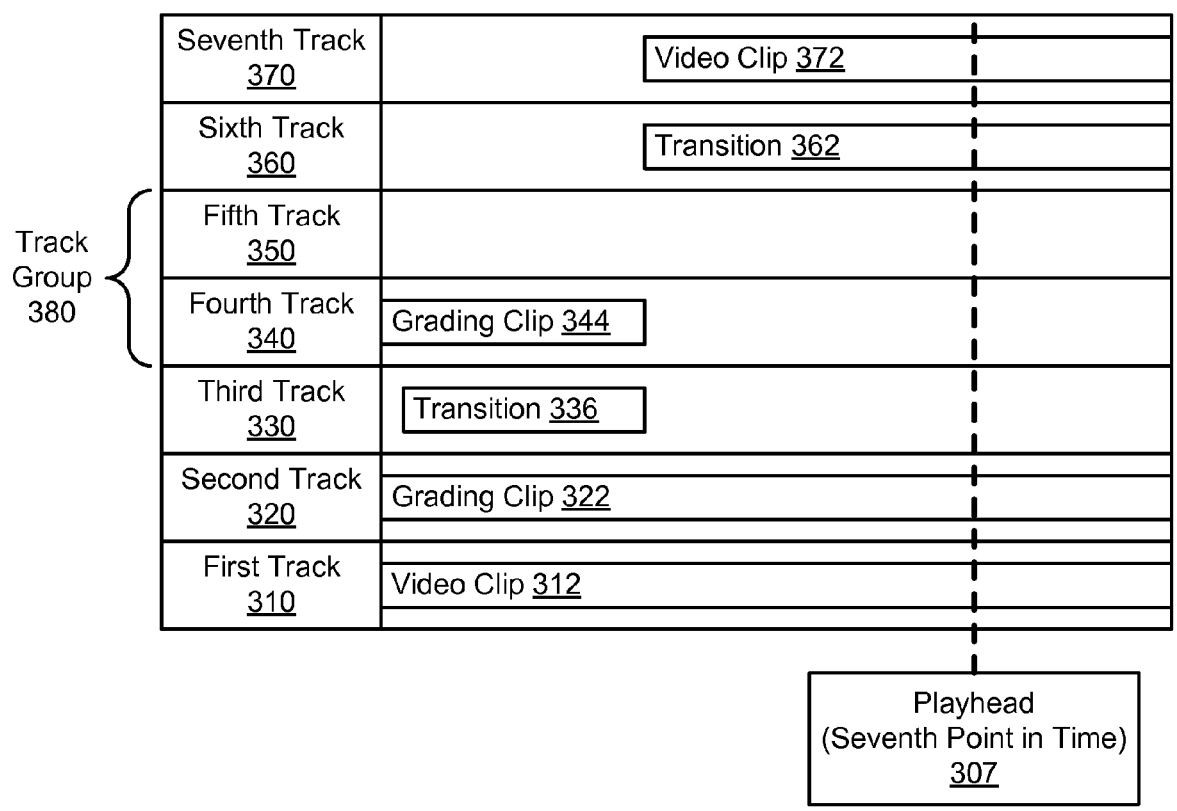
FIG. 9 illustrates a seventh example of a timeline that is automatically interpreted to produce compositing instructions, according to one embodiment.

FIG. 9 illustrates a seventh example of a timeline that is automatically interpreted to produce compositing instructions, according to one embodiment. The combination of elements intersected by the playhead 307 at the seventh point in time is one of the valid combinations of inputs for the dissolve operator. Each of the valid combinations produces a fixed, pre-programmed sequence of instructions, with the input sequences inserted at appropriate places. In this example, although it appears that the clip below the transition (e.g., dissolve) 362 (in the sixth track 360) is the grading clip 322 (in the second track 320, that combination may be invalid and may thus produce an empty instruction sequence. Accordingly, if the transition's input immediately above is a video clip, then the timeline interpretation module 104 may keep looking further down until it encounters another video clip or the bottom end of the timeline. In this example, it finds the video clip 312 (in the first track 310). This combination triggers recursion, just like a track group, and everything between the video clip 312 and the transition 362 may be processed first. In this example, the "Operand Grading" pattern will match first, and produce a two-instruction sequence of type Operand. After that, the inputs of the transition 362 on both sides will be Operands. This may result in the fixed sequence (of type Operand): bottom Operand|top Operand|*fade [%].

Figure 10:
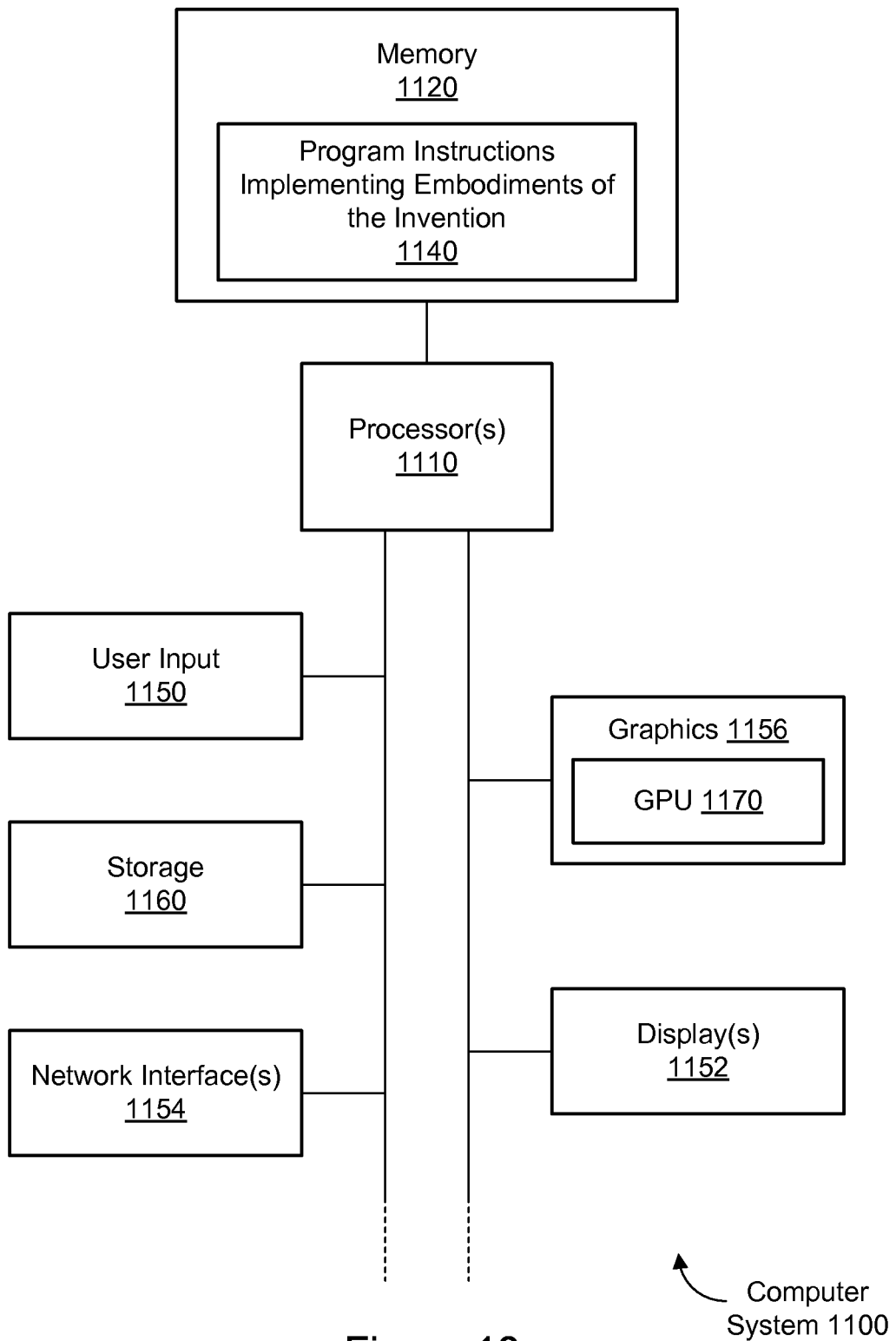
FIG. 10 is a block diagram of an example system configured to implement embodiments.

FIG. 10 is a block diagram illustrating constituent elements of a computer system 1100 that is configured to implement embodiments of the systems and methods described herein. The computer system 1100 may include one or more processors 1110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 1100, such as various versions of Unix, Linux, Windows® from Microsoft Corporation, MacOS® from Apple Inc., or any other operating system that enables the operation of software on a hardware platform. The processor(s) 1110 may be coupled to one or more of the other illustrated components, such as a memory 1120, by at least one communications bus.

In one embodiment, a specialized graphics card or other graphics component 1156 may be coupled to the processor(s) 1110. The graphics component 1156 may include a graphics processing unit (GPU) 1170, which in some embodiments may be used to perform at least a portion of the techniques described herein. The GPU 1170 may be configured to execute one or more pixel shader programs and/or one or more vertex shader programs. Additionally, the computer system 1100 may include one or more imaging devices 1152. The one or more imaging devices 1152 may include various types of raster-based imaging devices such as monitors and printers. In one embodiment, the one or more imaging devices 1152 may include a 2D display device and/or a 3D display device. In one embodiment, one or more display devices 1152 may be coupled to the graphics component 1156 for display of data provided by the graphics component 1156.

In one embodiment, program instructions 1140 that may be executable by the processor(s) 1110 to implement aspects of the techniques described herein may be partly or fully resident within the memory 1120 at the computer system 1100 at any point in time. The memory 1120 may be implemented using any appropriate medium such as any of various types of ROM or RAM (e.g., DRAM, SDRAM, RDRAM, SRAM, etc.), or combinations thereof. The program instructions may also be stored on a storage device 1160 accessible from the processor(s) 1110. Any of a variety of storage devices 1160 may be used to store the program instructions 1140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 1160 may be coupled to the processor(s) 1110 through one or more storage or I/O interfaces. In some embodiments, the program instructions 1140 may be provided to the computer system 1100 via any suitable computer-readable storage medium including the memory 1120 and storage devices 1160 described above.

The computer system 1100 may also include one or more additional I/O interfaces, such as interfaces for one or more user input devices 1150. In addition, the computer system 1100 may include one or more network interfaces 1154 providing access to a network. It should be noted that one or more components of the computer system 1100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 1100 may also include numerous elements not shown in FIG. 10, as illustrated by the ellipsis.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A method implemented by a computing device, the method comprising:
   obtaining a video timeline by the computing device comprising a plurality of video elements of a video sequence;
   generating an array of data by the computing device comprising compositing instructions for each of the video elements arranged within the array according to the timeline;
   obtaining a plurality of array patterns by the computing device having a predefined order, each of the array patterns comprising a relationship between the compositing instructions;
   performing, by the computing device, in the predefined order for each of the plurality of array patterns, operations comprising:
      obtaining the array pattern by the computing device;
      determining by the computing device that two or more sections of the compositing instructions of the array match the array pattern; and
      responsive to determining that the sections of the array match the array pattern, replacing the sections of the array by the computing device with a modified section comprising modified compositing instructions corresponding to the pattern, the replacing effective to create a modified array of data with less items than the array; and
   responsive to the operations being performed for the plurality of array patterns, compositing a frame of the video sequence by the computing device according to the modified array.

2. The method as recited in claim 1, wherein the modified array after the operations have been performed for the plurality of array patterns comprises a single item.

3. The method as recited in claim 1, wherein at least one of the sections of the array that match the array pattern comprises previously modified instructions from a previously matched array pattern.

4. The method as recited in claim 1, wherein compositing the frame of the video sequence comprises using a compositing engine to interpret the modified compositing instructions in an order specified in the modified array.

5. The method as recited in claim 1, wherein the compositing instructions contain respective types of video elements, and wherein matching the array pattern to the array is dependent on the types of video elements.

6. The method as recited in claim 1, wherein the method further comprises removing an item from the array by the computing device that does not match any of the array patterns after the operations have been performed for the plurality of array patterns.

7. A system, comprising:
   at least one processor; and
   a memory coupled to the at least one processor, wherein the memory stores program instructions, wherein the program instructions are executable by the at least one processor to:
      obtain a video timeline comprising a plurality of video elements of a video sequence;

generate an array of data comprising compositing instructions for each of the video elements arranged within the array according to the timeline;
obtain a plurality of array patterns having a predefined order, each of the array patterns comprising a relationship between the compositing instructions;
perform, in the predefined order for each of the plurality of array patterns, operations comprising:
  obtaining the array pattern;
  determining that two or more sections of the compositing instructions of the array match the array pattern;
  responsive to determining that the sections of the array match the array pattern, replacing the sections of the array with a modified section comprising modified compositing instructions corresponding to the pattern, the replacing effective to create a modified array of data with less items than the array; and
  responsive to the operations being performed for the plurality of array patterns, composite a frame of the video sequence according to the modified array that comprises the compositing instructions corresponding to the pattern.

8. The system as recited in claim 7, wherein the modified array after the operations have been performed for the plurality of array patterns comprises a single item.

9. The system as recited in claim 7, wherein at least one of the sections of the array that match the array pattern comprises previously modified instructions from a previously matched array pattern.

10. The system as recited in claim 7, wherein compositing the frame of the video sequence comprises using a compositing engine to interpret the modified compositing instructions in an order specified in the modified array.

11. The system as recited in claim 7, wherein the compositing instructions contain respective types of video elements, and wherein matching the array pattern to the array is dependent on the types of video elements.

12. The system as recited in claim 7, wherein the program instructions are further executable by the at least one processor to remove an item from the array by the computing device that does not match any of the array patterns after the operations have been performed for the plurality of array patterns.

13. One or more non-transitory computer-readable storage media devices storing program instructions that are computer-executable to perform:
obtaining a video timeline comprising a plurality of video elements of a video sequence;
generating an array of data comprising compositing instructions for each of the video elements arranged within the array according to the timeline;
obtaining a plurality of array patterns by the computing device having a predefined order, each of the array patterns comprising a relationship between the compositing instructions;
performing, by the computing device, in the predefined order for each of the plurality of array patterns, operations comprising:
  obtaining the array pattern;
  determining that two or more sections of the compositing instructions of the array match the array pattern;
  responsive to determining that the sections of the array match the array pattern, replacing the sections of the array with a modified section comprising modified compositing instructions corresponding to the pattern, the replacing effective to create a modified array of data with less items than the array; and
responsive to the operations being performed for the plurality of array patterns, compositing a frame of the video sequence according to the modified array.

14. The non-transitory computer-readable storage media devices as recited in claim 13, wherein the modified array after the operations have been performed for the plurality of array patterns comprises a single item.

15. The non-transitory computer-readable storage media devices as recited in claim 13, wherein compositing the frame of the video sequence comprises using a compositing engine to interpret the modified compositing instructions in an order specified in the modified array.

16. The non-transitory computer-readable storage media devices as recited in claim 13, wherein the compositing instructions contain respective types of video elements, and wherein matching the array pattern to the array is dependent on the types of video elements.

17. The non-transitory computer-readable storage media devices as recited in claim 13, wherein the instructions are further computer-executable to perform removing an item from the array by the computing device that does not match any of the array patterns after the operations have been performed for the plurality of array patterns.

18. The method as recited in claim 1, wherein a video element of the plurality of video elements comprises a video clip, grading clip, or transition.

19. The system as recited in claim 7, wherein a video element of the plurality of video elements comprises a video clip, grading clip, or transition.

20. The non-transitory computer-readable storage media devices as recited in claim 13, wherein a video element of the plurality of video elements comprises a video clip, grading clip, or transition.

* * * * *